(12) United States Patent
Roth et al.

(10) Patent No.: US 6,665,795 B1
(45) Date of Patent: Dec. 16, 2003

(54) RESETTING A PROGRAMMABLE PROCESSOR

(75) Inventors: Charles P. Roth, Austin, TX (US); Ravi P. Singh, Austin, TX (US); Gregory A. Overkamp, Austin, TX (US)

(73) Assignees: Intel Corporation, Santa Clara, CA (US); Analog Devices, Inc., Norwood, MA (US)

(*) Notice: Subject to any disclaimer, the term of this patent is extended or adjusted under 35 U.S.C. 154(b) by 645 days.

(21) Appl. No.: 09/684,113

(22) Filed: Oct. 6, 2000

(51) Int. Cl.⁷ ............................................. G06F 15/177
(52) U.S. Cl. ..................................................... 713/1
(58) Field of Search ....................................... 713/1, 2

(56) References Cited

U.S. PATENT DOCUMENTS 4,794,517 A    12/1988   Jones et al.
5,938,728 A *  8/1999   Dwork et al. ............... 709/222

FOREIGN PATENT DOCUMENTS

| EP | 0 576 749 | 1/1994 |
| EP | 0 992 916 | 4/2000 |
| WO | WO98/12633 | 3/1998 |

* cited by examiner

Primary Examiner—Thomas M. Heckler
(74) Attorney, Agent, or Firm—Fish & Richardson P.C.

(57) ABSTRACT

In one embodiment, a pipelined processor includes a reset unit that provides an output reset signal to at least one stage of the pipeline. The reset unit is adapted to detect at least a hard reset request, a soft reset request and an emulation reset request. The pipeline comprises N stages and the reset unit asserts the reset signal for at least N cycles of a clock after the reset request has been cleared. Each stage if the pipeline has a storage circuit for storing a corresponding valid bit. At least one of the storage circuits is cleared in response to the reset signal. In addition, the reset unit handles the reset request as a reset event having an assigned priority.

45 Claims, 5 Drawing Sheets

RESETTING A PROGRAMMABLE PROCESSOR

BACKGROUND

This invention relates to resetting a programmable processor.

A programmable processor, such as a microprocessor for a computer or a digital signal processing system, typically supports one or more mechanisms for initializing the processor into a known state. For example, conventional processors often include an interface pin to support a "hard reset" in response to a reset button. In addition, conventional processors support a "soft reset" in which the reset process is initiated by software running on the processor.

DESCRIPTION

Figure 1:
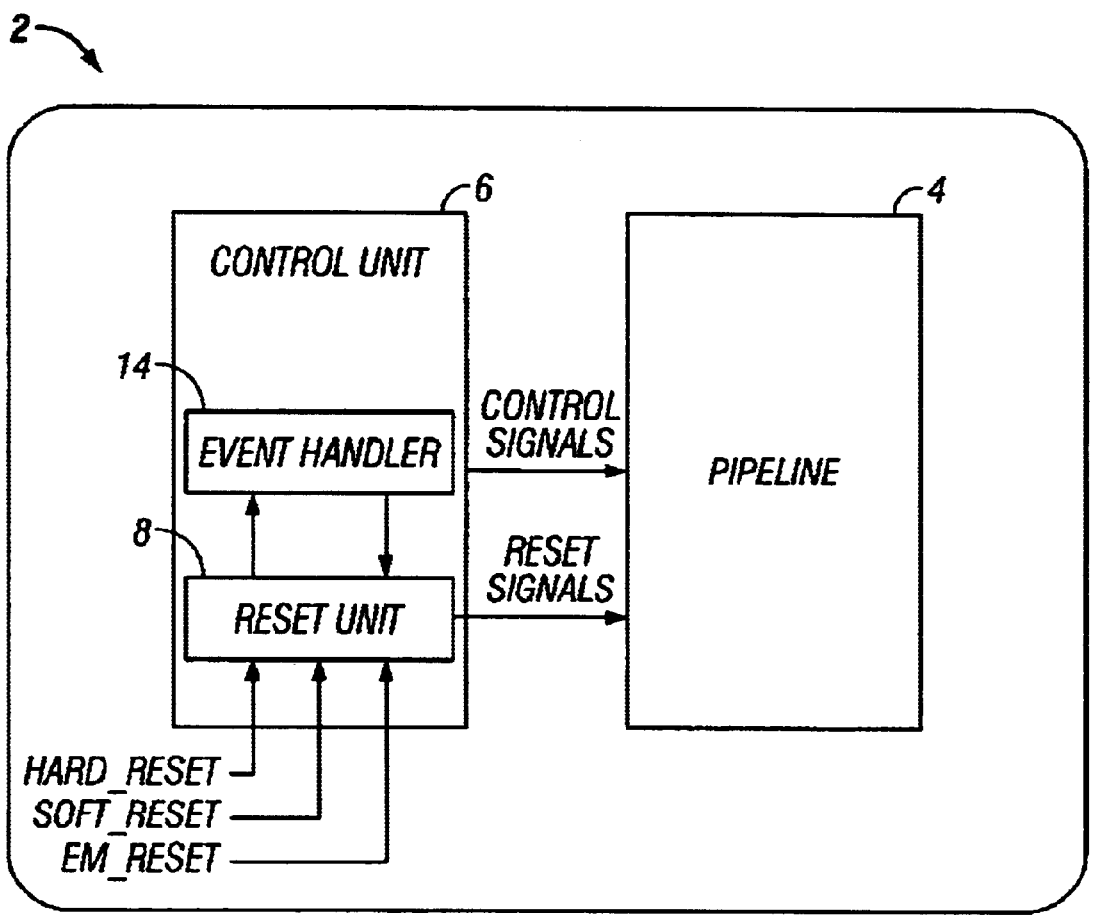
FIG. 1 is a block diagram illustrating an example of a pipelined programmable processor according to the invention.

FIG. 1 is a block diagram illustrating a programmable processor 2 having an execution pipeline 4 and a control unit 6. Control unit 6 controls the flow of instructions and data through pipeline 4 for every clock cycle. For example, during the processing of an instruction, control unit 6 directs the various components of the pipeline to decode the instruction and correctly perform the corresponding operation including, for example, writing the results back to memory.

Instructions are loaded into a first stage of pipeline 4 and processed through the subsequent stages. Each stage processes concurrently with the other stages. Data passes between the stages in pipeline 4 in accordance with a system clock. The results of the instructions emerge at the end of the pipeline 4 in rapid succession.

Reset unit 8 resets processor 2 in response to three types of reset requests: (1) a hard reset (hard_reset), typically caused by a user cycling power or pressing a reset button, (2) a soft reset (soft_reset), typically initiated by software applications executing on processor 2, and (3) an emulator reset, typically issued by an in-circuit hardware emulator (ICE). Reset unit 8 detects a reset condition and informs event handler 14 of the reset request. Event handler 14 includes logic for receiving and handling all system events that occur within processor 2 and, as explained in detail below, handles a reset request as a high-priority event.

Figure 2:
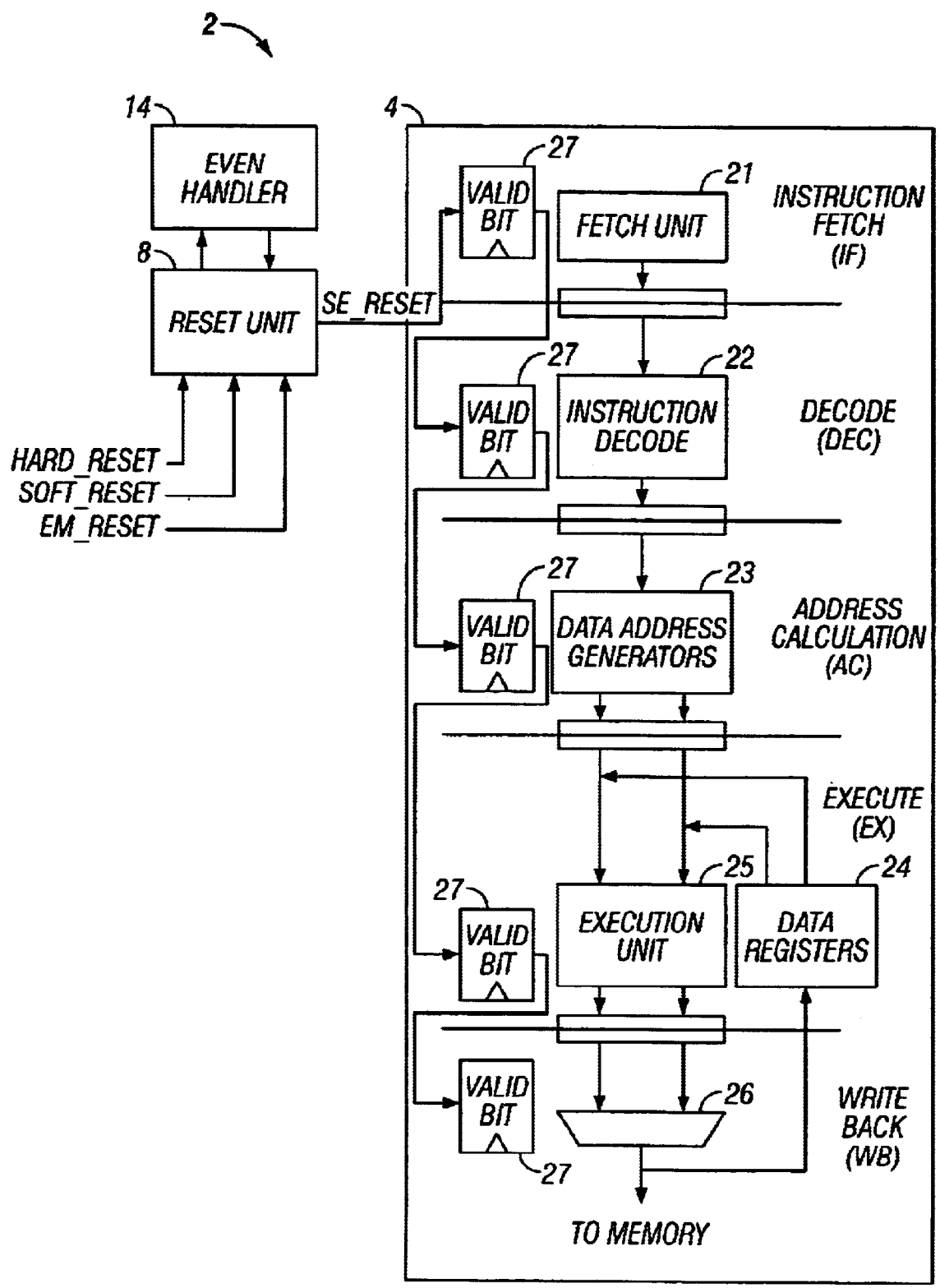
FIG. 2 is a schematic illustrating an example execution pipeline according to the invention.

FIG. 2 illustrates an example pipeline 4 according to the invention. Pipeline 4, for example, has five stages: instruction fetch (IF), instruction decode (DEC), address calculation (AC), execute (EX) and write back (WB). Instructions are fetched from memory, or from an instruction cache, during the first stage (IF) by fetch unit 21 and decoded during the second stage (DEC). At the next clock cycle, the results are passed to the third stage (AC), where data address generators 23 calculate any memory addresses that are necessary to perform the operation.

During the execution stage (EX), execution unit 25, performs the specified operation such as, for example, adding or multiplying two numbers. Execution unit 25 may contain specialized hardware for performing the operations including, for example, one or more arithmetic logic units (ALU's), floating-point units (FPU) and barrel shifters. A variety of data may be applied to execution unit 25 such as the addresses generated by data address generators 23, data retrieved from memory or data retrieved from data registers 24. During the final stage (WB), the results are written back to data memory or to data registers 24.

The stages of pipeline 4 include storage circuits 27, such as flip-flops, for storing "valid bits" indicating whether the instruction held by the corresponding stage is a valid instruction and should be processed. Initially, fetch unit 21 sets an instruction's corresponding valid bit when the instruction is successfully fetched and decoded. The valid bit propagates through the storage circuits 27 of pipeline 4 as the instruction is processed.

In order to effectively and quickly reset the processor 2, and to reduce the often excessive power consumption during reset, reset unit 8 clears the valid bits when a reset event is accepted by reset handler. More specifically, reset_unit 8 issues a reset (SE_RESET) to pipeline 4, which clears storage circuit 27 of the IF stage, thereby invalidating the instruction held within the IF stage. During subsequent clock cycles, the storage circuits 27 of the remaining stages are cleared until SE_RESET is deasserted, effectively invalidating the contents of pipeline 4.

Figure 3:
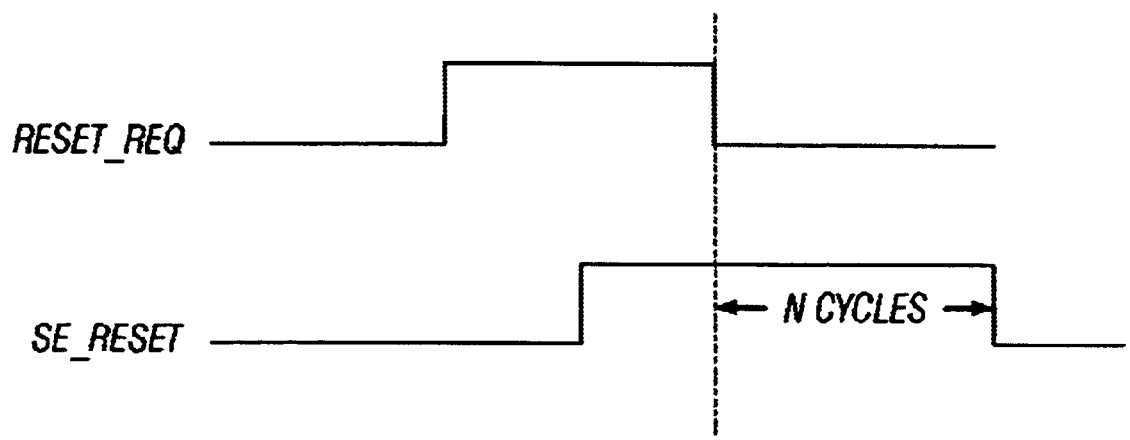
FIG. 3 is a timing diagram further illustrating the reset process.

FIG. 3 is a timing diagram further illustrating the reset process in response to a reset condition including, for example, a hard reset, a soft reset or a reset from an emulator. Notably, reset unit 8 is responsive to the length of time the RESET_REQ signal remains active and, in particular, is adapted to hold SE_RESET active after the reset signal has been removed in order to ensure pipeline 4 is fully initialized. More specifically, reset unit 8 assets SE_RESET for at least N clock cycles after the reset request is deasserted, where pipeline 4 is N stages deep.

Figure 4:
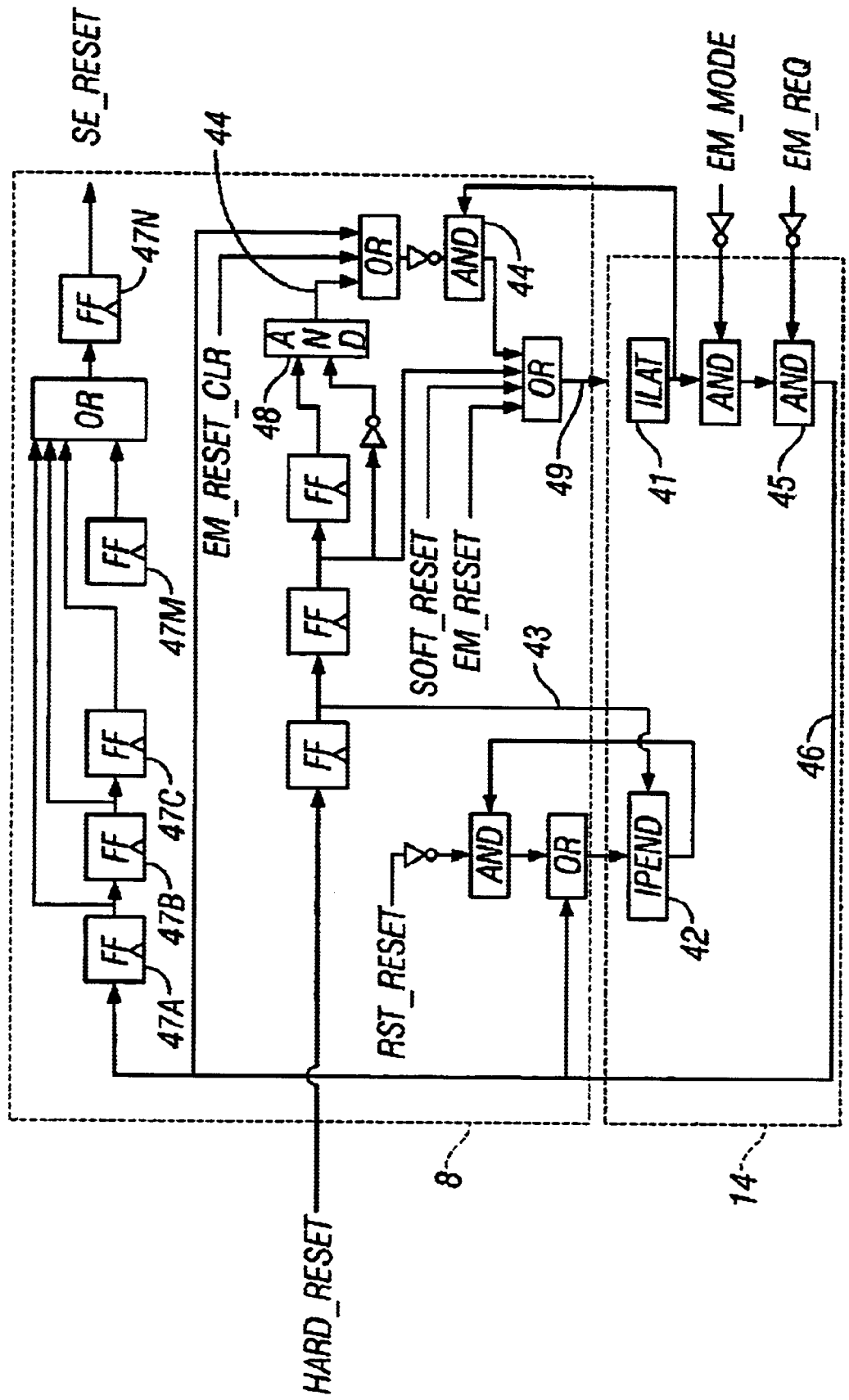
FIG. 4 is a schematic diagram illustrating example circuits for resetting the processor according to the invention.

As discussed in detail below, reset unit 8 and event handler 15 support a synchronous reset in that a reset request is treated as a high-priority event that may reset processor 2, depending on the priority of any other pending event. FIG. 4 is a schematic diagram illustrating an example embodiment for reset unit 8 and event handler 14. As explained in detail below, reset unit 8 interacts with event handler 14 to ensure that a single cycle pulse on any of the reset inputs is sufficient to fully reset and initialize pipeline 4. Reset unit 8 has three inputs for receiving three types of reset conditions: HARD_RESET, SOFT_RESET and EM_RESET. In addition, reset unit 8 receives EM_RESET_CLR that is asserted when the emulation reset request has been cleared, respectively.

Event handler 14 includes two registers: ILAT register 41 and IPEND register 42. The ILAT register 41 includes a number of bits for storing requested events that have not been serviced. An "event" is any action or occurrence to which processor 2 must respond including, for example, entering emulation mode, interrupts and exceptions. ILAT register 41 is cleared when the event is taken by event handler 14. IPEND register 42 is a status register that includes a corresponding bit for each event. Once processor 2 accepts an event and, for example, invokes a corresponding service routine, event handler 14 sets the appropriate bit within IPEND register 42 and clears the corresponding bit in ILAT register 14. Event handler 14 clears, the status bit of IPEND register 42 when the event service routine returns.

In one embodiment, event handler 14 treats a reset event as the second highest priority event, with only emulation mode having a higher priority. When a reset event is received and processor 2 is in emulation mode, the reset event is not taken until processor 2 exits from emulation mode.

When HARD_RESET is asserted for at least one clock cycle, signal 43 clears the reset event bit of IPEND register 42, thereby clearing any pending reset events. Next, after a second clock cycle, signal 49 sets the reset event bit within ILAT 41 to record the pending reset event. Event handler 14 accepts the reset event when processor 2 is not in emulation mode and asserts RESET_MASKED_REQ 46 to indicate that reset unit 8 may generate a reset pulse. More specifically, AND gate 45 drives RESET_MASKED_REQ 46 high when: (1) ILAT register 41 indicates that a reset event has been accepted, (2) processor 2 is not in emulation mode (EM_MODE) and (3) there is not a current emulation request (EM_REQ). Reset unit 8 latches RESET_MASKED_REQ 56 into a series of storage circuits 47 over N clock cycles, causing SE_RESET to be active for N clock cycles after RESET_MASKED_REQ 56 is deasserted.

When the reset condition is no longer detected, reset unit 8 instructs event handler 14 to clear SE_RESET. In the case of a hard reset, AND gate 48 drives HARD_RST_FEDGE 44 high when a falling edge is detected on HARD_RESET. Alternatively, EM_RESET_CLR is asserted when an emulation reset request is cleared, respectively. Assertion of either of these two signals causes AND gate 44 to output a zero, thereby clearing the reset event bit within ILAT register 51. This in turn clears RESET_MASKED_REQ 46 and, N clock cycles later, clears SE_RESET. In this fashion, reset unit 8 holds SE_RESET active for N clock cycles after a reset condition is removed.

IPEND register 42 is cleared when SE_RESET is deasserted and when the RST_EXIT signal is asserted, typically upon the conclusion of an event handling service routine by the execution of a return from interrupt instruction (RTI).

Figure 5:
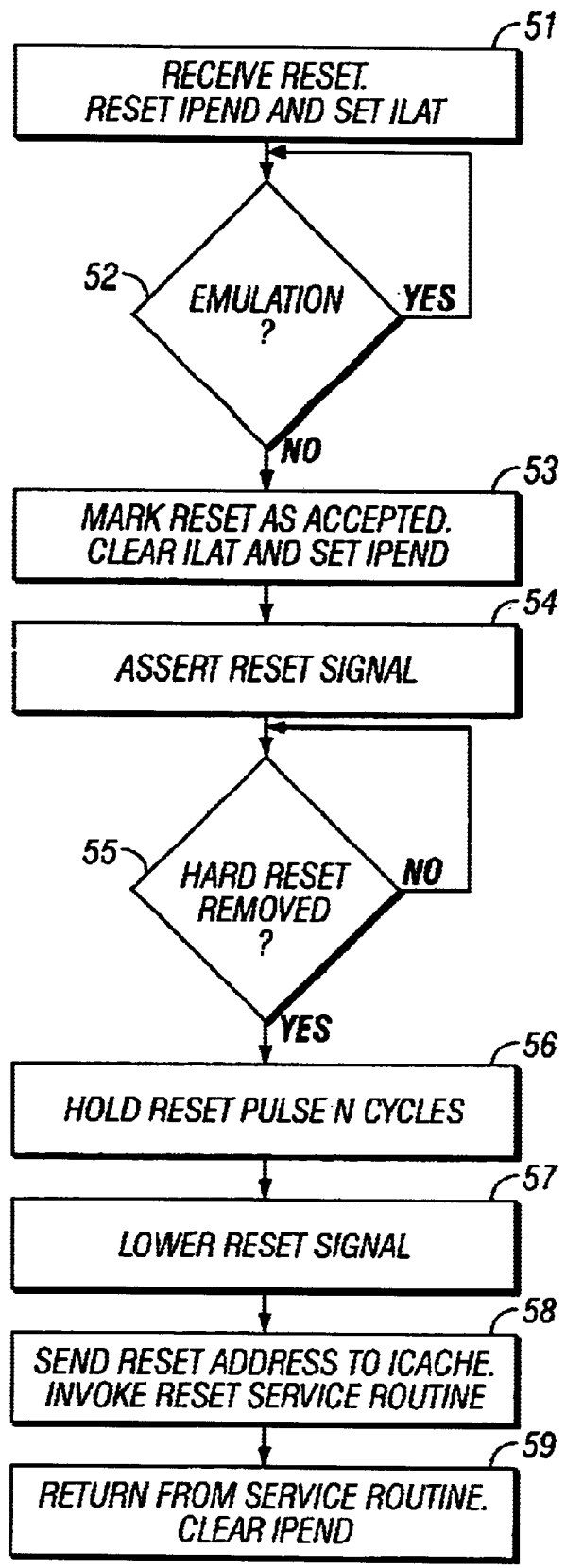
FIG. 5 is a flowchart illustrating an example process for resetting the pipelined processor.

FIG. 5 is a flowchart illustrating an example process 40 for resetting processor 2. First, reset logic 6 receives a reset request, such as a hard reset request generated when the user presses a physical reset button. Next, for hard reset requests, reset unit 8 resets the IPEND register 42 to clear the reset event bit one clock cycle after receiving the hard reset request. In addition, reset unit 8 sets the appropriate bit in ILAT register 41 of event handler 14 to record the event request (51).

After receiving the reset request and updating ILAT register 41, event handler 14 checks whether processor 2 is in emulation mode or whether an emulation request is pending (52); When no longer in emulation mode, and no emulation request is pending, event handler 14 marks the reset event as accepted by setting the appropriate bit of IPEND register 42 and clearing the appropriate bit of ILAT register 41 (53).

Next, event handler 14 asserts SE_RESET (54) and monitors the reset requests to detect when the reset request is removed. For example, a software reset request typically lasts for a single clock cycle but a hard reset request may last many clock cycles depending on how long the user presses the reset button.

After the reset request is removed (55), reset unit 8 holds SE_RESET for an additional N cycles to propagate cleared valid bits through pipeline 4, thereby marking the stages of pipeline 4 as invalid (56). As described above, the cleared valid bits prevent instruction fetch unit 21 from fetching instructions, causing processor 2 to consume less power during reset. After N cycles, reset unit 8 deasserts SE_RESET (57) and pipeline 4 proceeds from the initialized state by issuing a reset address to fetch unit 21 (58). The reset address is typically the starting address for a reset service routine and may be read from a vector table or external input pins. When the reset service routine finishes execution, event handler clears the appropriate bit of IPEND register 42 to indicate completion of the reset process (59).

Various embodiments of the invention have been described. For example, a pipelined processor has been described that includes a reset unit that provides an output reset signal to at least one stage of an execution pipeline. The reset unit handles reset requests, such as hard resets, soft resets and emulation resets, as a reset event having an assigned priority.

The processor can be implemented in a variety of systems including general purpose computing systems, digital processing systems, laptop computers, personal digital assistants (PDA's) and cellular phones. In such a system, the processor may be coupled to a memory device, such as a FLASH memory device or a static random access memory (SRAM), that stores an operating system or other software applications. These and other embodiments are within the scope of the following claims.

What is claimed is:

1. A method comprising:
   receiving a request to reset a pipelined processor;
   clearing a valid bit within a stage of the pipelined processor in response to the reset request; and
   propagating the cleared valid bit to subsequent stages of the pipelined processor.

2. The method of claim 1, wherein receiving a reset request includes receiving one of a hard reset request, a soft reset request and an emulation reset request.

3. The method of claim 1, wherein the pipelined processor has N stages, and further including propagating a cleared valid bit to the subsequent stages for at least N cycles of a clock signal.

4. The method of claim 1 further including handling the reset request as a high-priority reset event.

5. The method of claim 4, wherein the reset event has a priority lower than at least one other event.

6. The method of claim 5, further comprising accepting the reset event after higher-priority events have been serviced.

7. The method of claim 4, wherein handling the reset request as an event comprises setting a bit within an event received register (ILAT).

8. The method of claim 7, wherein handling the reset request as an event further comprises clearing a bit within an event status register (IPEND), prior to setting the bit within the ILAT register.

9. The method of claim 4 further including accepting the reset event based on priority levels of other pending events.

10. The method of claim 9 further including synchronously generating a system reset signal when the reset event is accepted.

11. The method of claim 10, wherein generating the system reset signal includes synchronously generating the system reset signal when a duration of a hard reset request is at least one clock cycle.

12. A method comprising:
    receiving a request to reset a pipelined processor; and
    handling the reset request as a reset event having an assigned priority.

13. The method of claim 12, wherein the reset event has a priority lower than at least one other event.

14. The method of claim 12, wherein receiving a reset request includes receiving one of a hard reset request, a soft reset request and an emulation reset request.

15. The method of claim 12 further including accepting the reset event based on priority levels of other pending events.

16. The method of claim 12 further including synchronously generating a system reset signal when the reset event is accepted.

17. The method of claim 12, wherein handling the reset request includes synchronously generating the system reset signal when a duration of a hard reset request is at least one clock cycle.

18. The method of claim 12, wherein handling the reset request as an event comprises setting a bit within an event received register (ILAT).

19. The method of claim 12, further comprising accepting the reset event after higher-priority events have been serviced.

20. The method of claim 12 further including:
clearing a valid bit within a stage of the pipelined processor when the reset event is accepted; and
propagating the cleared valid bit to subsequent stages of the pipelined processor.

21. The method of claim 12, wherein the pipelined processor has N stages, and further including propagating a cleared valid bit to the subsequent stages for at least N cycles of a clock signal.

22. An apparatus comprising:
an execution pipeline having a plurality of stages, wherein the stages include storage circuits for storing valid bits;
a reset unit having an output reset signal coupled to the execution pipeline to clear the valid bit of at least one of the storage circuits; and
a control unit adapted to propagate the cleared valid bit through the storage circuits of the execution pipeline.

23. The apparatus of claim 22, wherein the reset unit is adapted to assert the reset signal in response to one of a hard reset request, a soft reset request and an emulation reset request.

24. The apparatus of claim 22, wherein the execution pipeline comprises N stages and the reset unit is adapted to assert the reset signal for at least N cycles of a clock.

25. The apparatus of claim 22, wherein the execution pipeline has N stages and the reset unit comprises:
N−1 serially coupled storage circuits adapted to propagate the reset signal;
an OR gate receiving the reset signal from the serially coupled storage units; and
a storage circuit adapted to receive an output of the OR gate and provide the reset signal to the execution pipeline.

26. A programmable processor comprising:
an event handler having an event status register (IPEND) adapted to process a reset request as an event having an assigned priority, wherein the reset request is one of a hard reset request and a soft reset request; and
a reset unit adapted to output a system reset signal when the event handler accepts the reset event.

27. The programmable processor of claim 26 wherein the event handler comprises:
an event received register (ILAT) having a bit indicating whether the reset event is pending; and
an event status register (IPEND) having a bit indicating whether the reset event has been accepted.

28. The programmable processor of claim 27 further including:
an execution pipeline having a plurality of stages, wherein each stage has a storage circuit for storing a corresponding valid bit, and further wherein the execution pipeline is adapted to receive system reset signal to clear the valid bit of at least one of the storage circuits; and
a control unit adapted to propagate the cleared valid bit through the storage circuits of the execution pipeline.

29. The programmable processor of claim 28, wherein the execution pipeline has N stages and the reset unit comprises:
N−1 serially coupled storage circuits adapted to propagate the reset signal;
an OR gate receiving the reset signal from the serially coupled storage units; and
a storage circuit adapted to receive an output of the OR gate and provide the reset signal to the execution pipeline.

30. A method comprising:
receiving a request to reset a processor having an N stage pipeline;
generating a reset signal in response to the reset request; and
synchronously asserting the reset signal for N cycles of a clock after the reset request is cleared.

31. The method of claim 30, wherein receiving a reset request comprises receiving one of a hard reset request, a soft reset request and an emulation reset request.

32. The method of claim 30, and further including clearing valid bits within the stages of the pipeline in response to the reset signal.

33. The method of claim 30 and further including propagating a cleared valid bit the pipelined processor in response to the cleared valid bits.

34. A method comprising:
receiving a request to reset a processor;
updating a bit within an event pending register to indicate a reset event is currently pending;
updating a bit within an event status register when an event handler accepts the reset event;
asserting a reset signal in response to the accepted reset event;
invoking a reset service routine when the reset signal is deasserted.

35. The method of claim 34, further comprising asserting the reset signal for N cycles of a clock after the reset request is cleared, wherein the processor includes an N stage pipeline.

36. The method of claim 34, further comprising:
clearing the bit within the event pending register when the reset request is cleared; and
clearing the bit within the event status register when the reset service routine terminates.

37. The method of claim 34, wherein the event status register is updated when the reset request exists for at least one cycle of a clock.

38. The method of claim 34, and further including clearing valid bits within the stages of the pipeline in response to the reset signal.

39. A system comprising:
a memory device;

a processor coupled to the memory device, wherein the processor includes an event handler adapted to process a reset request as an event having an assigned priority, wherein the reset request is one of a hard reset request and a soft reset request.

40. The system of claim 39, wherein the processor includes a reset unit adapted to output a system reset signal when the event handler accepts the reset event.

41. The system of claim 39, wherein the event handler comprises:
   an event received register (ILAT) having a bit indicating whether the reset event is pending; and
   an event status register (IPEND) having a bit indicating whether the reset event has been accepted.

42. The system of claim 39 further including:
   an execution pipeline having a plurality of stages, wherein each stage has a storage circuit for storing a corresponding valid bit, and further wherein the execution pipeline is adapted to receive system reset signal to clear the valid bit of at least one of the storage circuits; and a control unit adapted to propagate the cleared valid bit through the storage circuits of the execution pipeline.

43. The system of claim 42, wherein the execution pipeline has N stages and the reset unit comprises:

N−1 serially coupled storage circuits adapted to propagate the reset signal;

an OR gate receiving the reset signal from the serially coupled storage units; and a storage circuit adapted to receive an output of the OR gate and provide the reset signal to the execution pipeline.

44. The system of claim 39, wherein the memory device comprises static random access memory.

45. The system of claim 39, wherein the memory device comprises FLASH memory.

* * * * *